United States Patent [19]
Sakanushi

[11] Patent Number: 5,974,010
[45] Date of Patent: Oct. 26, 1999

[54] MIRROR SIGNAL ARITHMETIC CIRCUIT IN AN OPTICAL DISK DRIVE

[75] Inventor: Yoshihiro Sakanushi, Kanagawa, Japan

[73] Assignee: Mitsumi Electric Co. Ltd., Tokyo, Japan

[21] Appl. No.: 08/908,465

[22] Filed: Aug. 7, 1997

[51] Int. Cl.⁶ ........................................................ G11B 7/00
[52] U.S. Cl. ........................................................ 369/44.41
[58] Field of Search ........................... 369/44.37, 44.41, 369/44.42, 124, 44.34, 44.35

[56] References Cited

U.S. PATENT DOCUMENTS

| | | | |
|---|---|---|---|
| 5,084,851 | 1/1992 | Noda et al. | 369/44.42 |
| 5,229,984 | 7/1993 | Konno et al. | 369/44.41 |
| 5,396,478 | 3/1995 | Krantz | 369/44.41 |
| 5,426,626 | 6/1995 | Katayama | 369/44.41 |
| 5,453,963 | 9/1995 | Katayama et al. | 369/44.41 |
| 5,532,999 | 7/1996 | Aikoh et al. | 369/44.42 |
| 5,719,389 | 2/1998 | Taniguchi | 369/44.41 |
| 5,764,606 | 6/1998 | Fukumoto et al. | 369/44.37 |
| 5,796,689 | 9/1998 | Houmoto et al. | 369/44.41 |
| 5,808,991 | 9/1998 | Inoue | 369/44.41 |
| 5,815,473 | 9/1998 | Takahashi et al. | 369/44.41 |

*Primary Examiner*—Nabil Hindi
*Attorney, Agent, or Firm*—Whitham, Curtis & Whitham

[57] ABSTRACT

In an optical pickup, the sum signal $-V_{MAIN}$ of the light receiving sections A, B, C and D of a main photo diode is applied to an inversion amplifier Amp9, and the sum signal $V_{MAIN}$ is applied to a data processor section and a mirror signal arithmetic section. An inversion amplifier Amp10, on the side of sub photo diodes, receives the sum of the sum signal $-V_{SUB\_E}$ and a corrected signal $C^*V_{MAIN}$ which is obtained by adjusting the sum signal $V_{MAIN}$ of the main photo diode with a variable resistor VR1. The output of the inversion amplifier Amp10 becomes a regular sub beam receiving signal $V_{SUB}$ which is obtained by subtracting a correcting signal whose voltage is equal to the main beam leakage signal from the sub photo diode sum signal $V_{SUB\_E}$. The regular sub beam receiving signal is applied to the mirror signal arithmetic section.

1 Claim, 2 Drawing Sheets

MIRROR SIGNAL ARITHMETIC CIRCUIT IN AN OPTICAL DISK DRIVE

BACKGROUND OF THE INVENTION

1. Field of the invention

This invention relates to optical disk drive mirror signal arithmetic circuits, and more particularly to an optical disk drive mirror signal arithmetic circuit in which a mirror signal is eliminated which is due to a main beam leakage signal to a sub photo diode.

2. Related art

As shown in FIG. 2, a Light receiving section of a three-spot beam pickup employed for an optical disk drive comprises: a main photo diode 1 at the center; and right and left photo diodes provided on both sides of the main photo diode 1. The main photo diode receives a main beam though a cylindrical lens, and has a light receiving surface which is radially divided into four parts (A, B, C and D). A focus servo mechanism utilizes the difference between the outputs of two pairs (A and C, and B and D) in each of which two light receiving surfaces are confronted with each other through the optical axis), controls the focus of the objective lens, and uses a decoder to decode the sum signal of main beams received, and a control section reads a digital signal.

A tracking error signal is produced owing to the difference between the quantities of received light of sub beams SB of the right and left sub photo diodes 2 and 3, and a tracking servo mechanism controls a tracking actuator to position the main beam on the data track of the optical disk.

In order to count the number of tracks which have passed at the time of random access, a mirror signal $V_{MIRR}$ adapted to detect a mirror surface section of the optical disk is calculated from a current-voltage-converted main photo diode sum signal $V_{MAIN}$ and a sub photo diode sum signal $V_{SUB}$, and it is determined from the voltage level of the mirror signal $V_{MIRR}$ whether the main beam is on the data track groove of the optical disk, or whether it is on the mirror surface section between tracks.

$$V_{MIRR} = V_{MAIN} - k^* V_{SUB} \qquad \text{Equation (1)}$$

where $V_{MAIN} = V_A + V_B + V_C + V_D$ $V_{SUB} + V_E + V_F + V_G + V_H$ k=ratio of the quantity of light of the main beam to that of the sub beam However, as indicated in a main beam quantity-of-light distribution graph of FIG. 2, at the time of random access the periphery of the main beam MB reflected from the data track groove of the optical disk is applied to the sub photo diodes 2 and 3, as a result of which sometimes the sum signal of the sub photo diodes may be $V_{SUB\ E}$ which includes the incidence light $V_{SUB}$ of the sub beams SB, and the leakage signal $V_{err}$ of the main beam.

$$V_{SUB\ E} = (V_E + V_F V_G + V_H) + (V_{E\ err} + V_{F\ err} + V_{G\ err} + V_{H\ err})$$

The sub photo diode main beam leakage signal $V_{err}$ causes no trouble in the tracking servo that a tracking control signal is formed according to the difference between the outputs of the right and left sub photo diodes, because it is canceled out by subtraction; however, in the case of the mirror signal $V_{MIRR}$ adapted to obtain the sum of the outputs of the right and left sub photo diodes, it becomes an error, as a result of which a track count error occurs; that is, it becomes impossible to achieve a seek operation.

This gives rises to a problem that, in the optical disk device, the track count error is technically eliminated, whereby the seek operation is improved in stability. Accordingly, an object of the invention is to solve the problem.

SUMMARY OF THE INVENTION

The foregoing object of the invention has been achieved by the provision of a mirror signal arithmetic circuit in an optical disk drive having three-spot beam type optical pickup in which a pair of sub photo diodes are arranged on both sides of a main photo diodes so that the main photo diode receives the main beams of a three-spot laser beam while the sub photo diodes receive the remaining sub beams, and an optical disk track counting mirror signal is formed by subtracting the sum signal of the sub photo diodes from the sum signal of the main photo diode, comprises:

a voltage adjusting unit which obtains a voltage from the sum signal of the main photo diode whose ratio is equal to a main beam quantity-of-light-receiving ratio of the sub photo diodes with respect to the main photo diode; and an arithmetic unit which subtracts an adjusted voltage from the sum signal of the sub photo diodes which is controlled by the voltage adjusting unit.

DETAILED DESCRIPTION OF THE PREFERRED EMBODIMENTS

Figure 1:
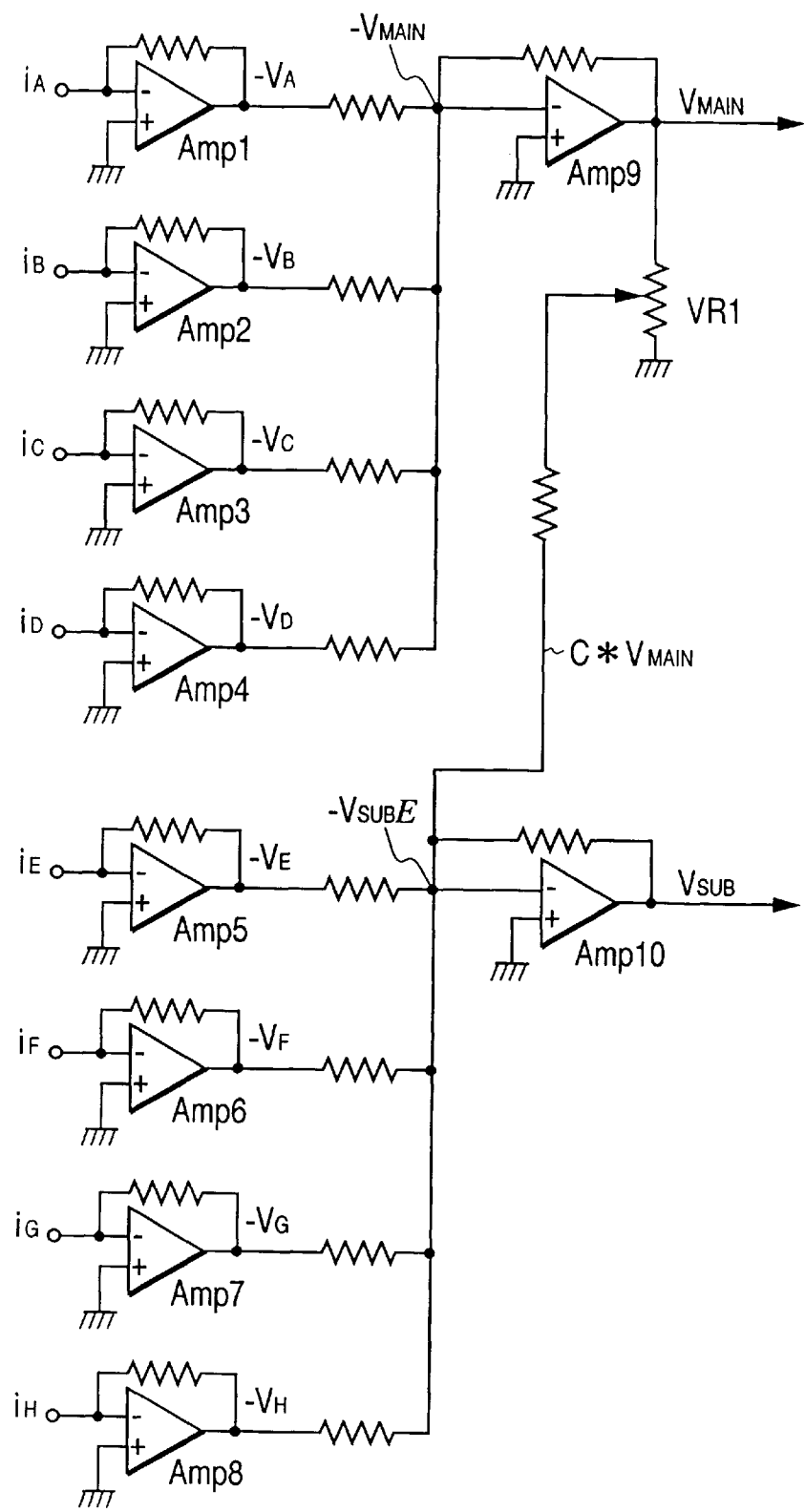
FIG. 1 is a circuit diagram of a mirror signal arithmetic circuit, which constitutes an embodiment of the invention.

One embodiment of the invention will be described with reference to the accompanying drawings. FIG. 1 shows a mirror signal arithmetic circuit in a write type optical disk drive. The divided light receiving sections A, B, . . . H of the main photo diode 1 and the sub photo diodes 2 and 3 which are shown in FIG. 2, are connected to inversion amplifiers Amp1 through Amp8, respectively, so that the output currents $i_A, i_B, \ldots i_E$ are converted into voltages.

The inverted sum signal $-V_{MAIN}$ of the divided light receiving sections of the main photo diode is inverted again by an inversion amplifier Amp9, so that the sum signal $V_{MAIN}$ is applied to a data processor section and a mirror signal arithmetic section, while the sum signal of the light receiving sections A and C and the sum signal of the light receiving sections B and D are applied to a focus servo circuit (not shown).

The output of the inversion amplifier Amp9 is connected through a variable resistor VR1 to an inversion amplifier Amp10 (on the side of the sub photo diodes), and the sum of an inverted sum signal $-V_{SUB\ E}$ of the sub photo diodes 2 and 3 and a corrected signal $C^* V_{MAIN}$ which is obtained by adjusting the sum signal $V_{MAIN}$ of the main photo diode 1 with the variable resistor VR1 is applied to the inversion amplifier Amp10.

Figure 2:
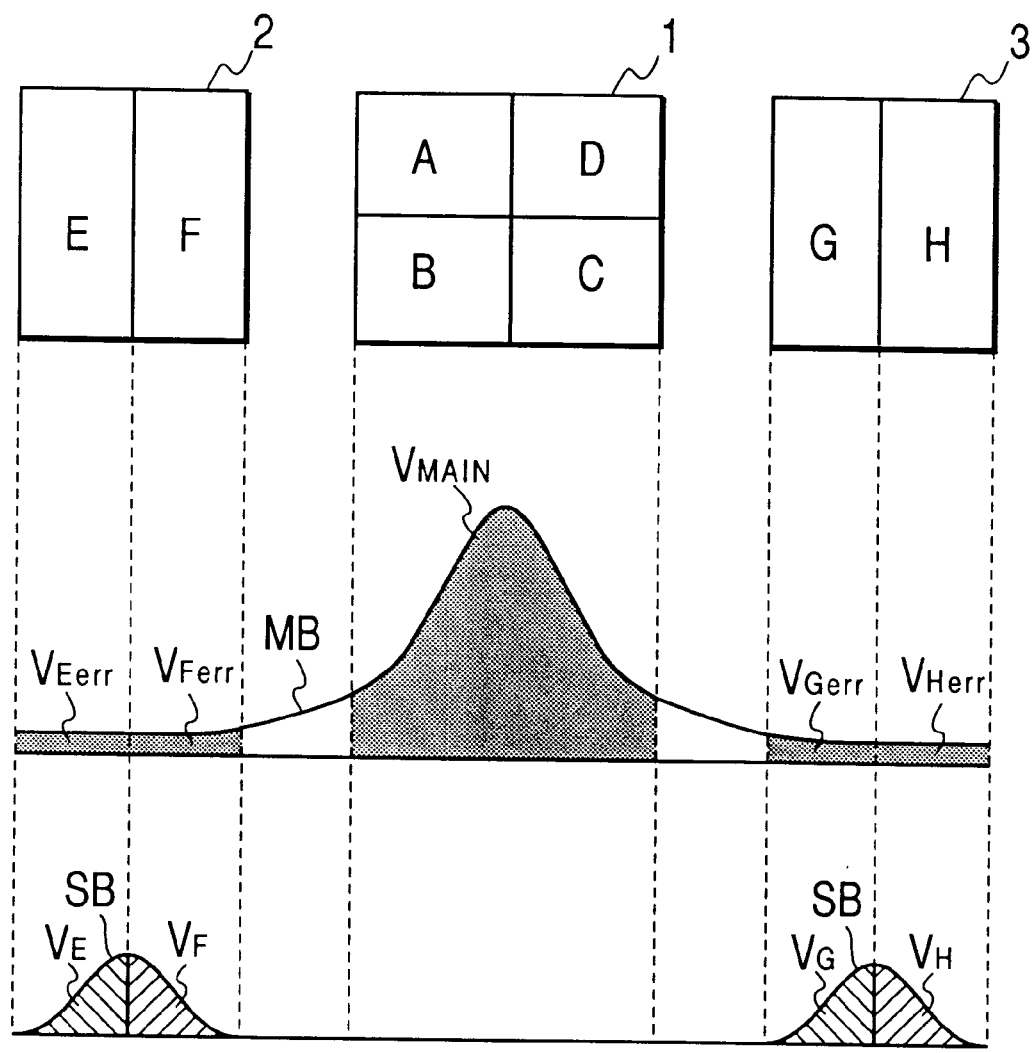
FIG. 2 is a diagram for a description of a quantity-of-received-light of a light receiving photo diode in an optical disk drive.

As is seen from FIG. 2, the leakage signal $V_{err}$ of the main beam MB applied to the sub photo diodes 13 is proportional to the quantity of received light $V_{MAIN}(=V_A + V_B + V_C + V_D)$ of the main photo diode. Hence, when the voltage ratio of the sum signal $V_{MAIN}$ of the main photo diode 1 to the corrected signal $C^*V_{MAIN}$ is adjusted to be equal to the main beam quantity-of-received-light ratio of the main photo diode 1 and the sub photo diodes 2 and 3, the corrected signal $C^*V_{MAIN}$ is equal to the sum $(V_{E\ err}+V_{F\ err}+V_{G\ err}+V_{H\ err})$ of the main beam leakage signals of the sub photo diodes 2 and 3.

Hence, the output of the inversion amplifier Amp10 is:

$$-(-V_{SUB\ E}+C^*V_{MAIN})=V_{SUB\ E}-V_{err}=V_{SUB}$$

That is, a true sub beam receiving signal $V_{SUB}$ is obtained which is the result of subtraction of the main beam leakage signal $V_{err}$ from the total light receiving signal $V_{SUB\ E}$ of the sub photo diodes 2 and 3.

On the other hand, the inversion amplifier Amp10 applies the sub beam receiving signal $V_{SUB}$ to the mirror signal arithmetic section, while the sun signal of the light receiving sections E and F and the sum signal of the light receiving section G and H are applied to a tracking servo circuit (not shown). The mirror signal arithmetic section calculates the mirror signal $V_{MIRR}$ according to the aforementioned Equation (1), and the control section discriminates the level change of the mirror signal which occurs when the main beam goes across the mirror surface section between the data track of the optical disk, thereby to count the number of times of track passage.

While there has been described in connection with the preferred embodiment of the invention, it will be well known to those skilled in the art that various changes and modifications may be made therein without departing from the invention, and it is aimed, therefore, to cover in the appended claim all such changes and modifications as fall within the true spirit and scope of the invention.

As was described above, in the arithmetic operation of the track counting mirror signal of the optical disk drive, the leakage of the main beam to the sub photo diodes, which causes the signal error, is subtracted. This feature eliminates the mirror signal error. Hence, the occurrence of the track counting error is eliminated, and the seek operation is improved in stability.

What is claimed is:

1. A mirror signal arithmetic circuit in an optical disk drive having three-part beam type optical pickup comprising:
   a pair of sub photo diodes arranged on both sides of a main photo diode so that said main photo diode receives the main beam of a three-spot laser beam while said sub photo diodes receive the remaining sub beams;
   an optical disk track counting mirror signal formed by subtracting the sum signal $V_{SUB\ E}$ of said sub photo diodes from the sum signal $V_{MAIN}$ of said main photo diode;
   a voltage adjusting unit which obtains a voltage from the sum signal of said main photo diode whose ratio is equal to a main beam quantity-of-light-receiving ratio of said sub photo diodes with respect to said main photo diode; and
   an arithmetic unit which subtracts an adjusted voltage $C^*V_{MAIN}$ from the sum signal $V_{SUB\ E}$ of said sub photo diodes which is controlled by said voltage adjusting unit, whereby a true sub beam receiving signal $V_{SUB}=-(-V_{SUB\ E}+C^*V_{MAIN})=V_{SUB\ E}-V_{err}$ where $V_{err}$ is a voltage leakage signal.

* * * * *